N. G. Norcross
Reciprocating Saw-Mill.
Nº 10,705.
Patented Mar. 28, 1854.
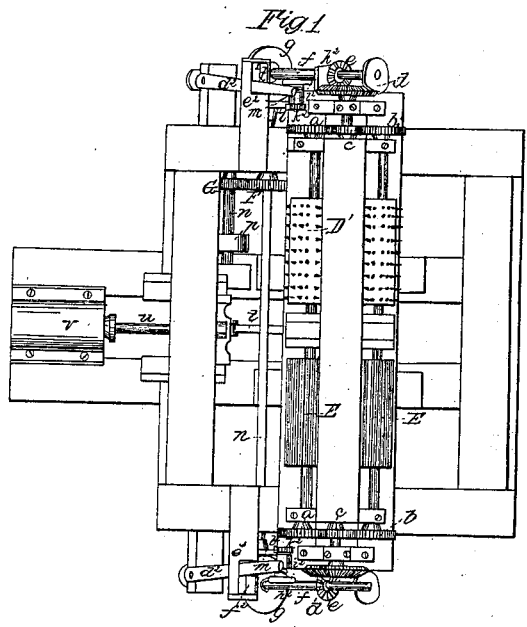
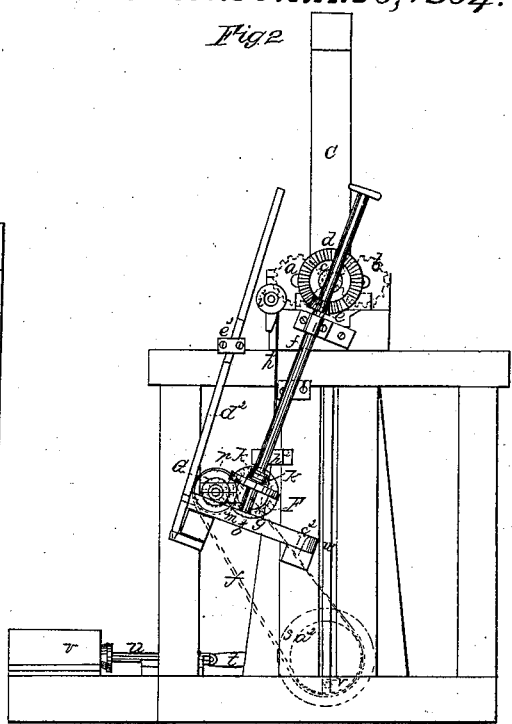
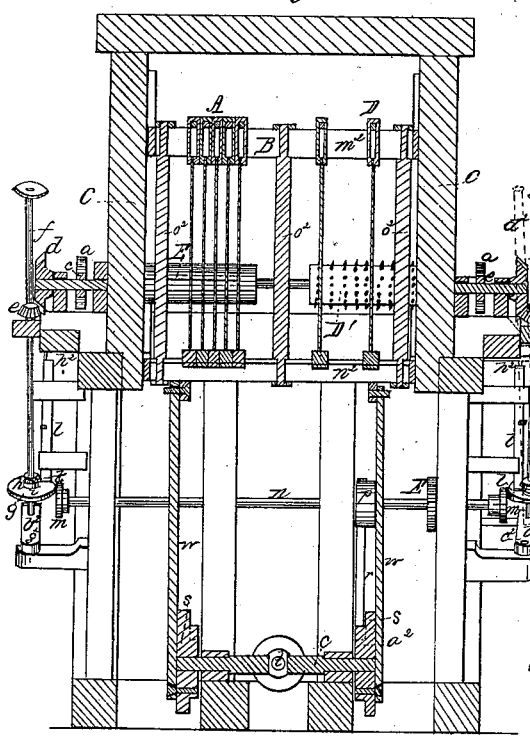
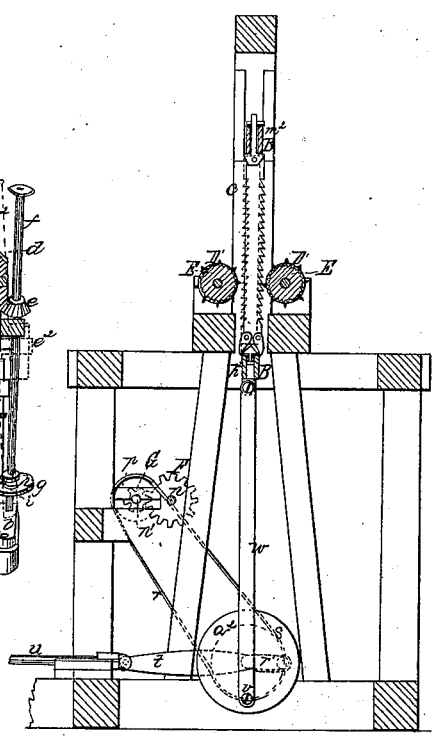

UNITED STATES PATENT OFFICE.

NICHOLAS G. NORCROSS, OF LOWELL, MASSACHUSETTS.

FEED-MOTION FOR SAWING LUMBER.

Specification of Letters Patent No. 10,705, dated March 28, 1854.

*To all whom it may concern:*

Be it known that I, NICHOLAS G. NOR-CROSS, of Lowell, in the county of Middlesex and State of Massachusetts, have invented a certain new and useful Improvement in Machinery for Sawing Lumber; and I do hereby declare that the same is fully described and represented in the following specification and the accompanying drawings, letters, figures, and references thereof.

Of the said drawings, Figure 1 denotes a top view of my improved sawing machinery. Fig. 2, is a side elevation of it. Fig. 3, is a central, vertical and longitudinal section of the machinery. Fig. 4, is a transverse and vertical section taken so as to exhibit one of the gangs of saws and the appurtenances thereof adjacent thereto. Fig. 5 is an end view of the sawing apparatus.

In the said drawings A and D represent two gangs of saws set in a frame B that is situated and plays vertically between parallel ways or rails C, C.

D', D', and E, E, are two sets of feed rollers, the former set being made with points, while the latter is fluted. Each set is applied to one of the gang of saws. The first of these sets of feed rollers serves to sustain the log or stick of timber during the operation of the saws on the said log or stick while slabbing it. The second serves to support the log when it is moved against the other gang of saws, and in an opposite direction. While the logs are being cut with the two gangs of saws, they move in opposite directions, the teeth of one gang being disposed in those edges of it which are opposite to the edges of the other gang, on which teeth are formed.

The shafts of the two sets of feed rollers revolve in suitable bearings, and those of each set have two spur gears, $a$, $b$, fixed respectively on their outer ends. The said gears are made to engage with a smaller gear $c$, placed directly between them and upon the shaft of a large bevel gear $d$, arranged as seen in the drawings. A beveled pinion, $e$, fixed on a long inclined shaft, $f$, is made to engage with the gear, $d$, the said shaft, $f$, being suitably supported in bearings, so as to be capable of a free revolution on its axis. A wheel $g$ slides freely up and down on the shaft but is so applied to the shaft that when the wheel is rotated it will rotate the shaft, the same being effected by a feather or spline connection well known to mechanics. This wheel has a groove, $h$, cut in and around its hub, $i$, the said groove being for the reception of a projection or fork, $k$, that extends from a sliding lifter bar, $l$, arranged as seen in the drawings. On taking hold of the said lifter bar and pulling it upward, the wheel, $g$, may be raised upward from the lower part of the periphery of another vertical wheel, $m$, to the upper part of the same. The said vertical wheel, $m$, is fixed upon one end of a horizontal shaft, $n$, that is arranged below the gangs of saws.

The periphery of the wheel $g$ rests in contact with the external side of the wheel, $m$. The shaft, $n$, is connected with a shaft, $n'$, by gears, F, G. On the shaft, $n'$, there is a pulley, $p$, around which and a pulley, $a^2$, on the main driving shaft, $q$, an endless belt, $r$, is carried, and is for the purpose of communicating motion from the shaft, $q$, to the shaft, $n$.

The shaft, $q$, has a bell crank, $r'$, in the middle of it, and a crank wheel, $s$, on each of its outer ends, the crank, $r'$, being jointed to the connecting rod, $t$, of the piston rod, $u$, of a steam engine cylinder, $v$, arranged as shown in the drawings. Each of the wheels, $s$, carries a crank pin, $v$, to which the lower end of one of two pitmen, $w$, $w$, is jointed, the said pitman at its upper end being connected to the saw frame, B. The lower end of the shaft, $f$, is sustained by a lever, $b^2$, which turns at one end on a fulcrum, $c^2$, and at its other end is jointed to an upright hand lever, $d^2$, which extends up through a mortise or slot made through a projection, $e^2$, from the framework. By means of a wedge, $f^2$, inserted down through the said mortise, the wheel, $g$, may be forced close up against the side of the wheel, $m$, and with all the pressure that may be necessary to produce the requisite amount of friction to cause the wheel, $m$, to put the wheel, $g$, in revolution when said wheel, $g$, is revolved. In order to elevate the wheel, $g$, and hold it any elevation, a chain or cord, $h^2$, is made to extend up from the lifter bar, $l$, and wind around a small windlass, $i^2$, to which a ratchet wheel, $k^2$, and a retaining pawl, $l^2$, are applied. On turning the windlass so as to wind the cord on it, the lifter bar may be raised up. By throwing the pawl out of engagement with the ratchet and turning back the windlass, the lifter bar may be lowered.

By means of the wheels, $g$, and $m$, the forward movement of the log can be regulated to any plate of the saw, or to accommodate the saw to the kind or state of the timber to be sawed. By raising the wheel, $g$, upward from the periphery of the wheel, $m$, toward its center, the feed may be reduced. By elevating the wheel, $g$, above the center of the wheel, $m$, we reverse the movement of the log, it being understood that the wheel, $g$, is pressed against the wheel, $m$, with sufficient power to enable the wheel, $m$, to rotate it and effect the movement of the log as stated. On the top of the shaft of the wheel, $g$, is a small hand wheel, by the aid of which an attendant can turn the shaft so as to operate the feed mechanism in such manner as may be sufficient to move the log for setting it up to the saw, or for any other purpose.

The arrangement of the teeth of one of the gangs of saws with respect to those of the other is shown in Fig. 4, wherein, those of one of the saws of one set or gang is exhibited in black, while those of one saw of the other gang is exhibited in red or dotted lines. The saw frame is composed of two parallel slotted bars, $m^2$, $n^2$, connected together by three round bars, $o^2$, $o^2$, $o^2$. Each half of the frame, or the space on either side of the middle bar, $o^2$, of it may be made to contain any number of saws. While one part may have one or two slabbing saws, the other part may hold a gang, whose respective saws may be disposed at proper distances asunder to enable them to reduce a log to boards during one entire longitudinal movement of it. As soon as a log has been slabbed by the slabbing saws, it is turned over and presented with what was its rear end against the other gang of saws and made to move in the opposite direction, the peculiar arrangement of the teeth of two gangs of saws permitting this to be effected without the necessity of making an entire back movement of the log in order to present it to the second gang of saws.

What I claim as my invention is:—

The method of regulating the velocity of the feed rollers of a gang of saws, viz., by a sliding wheel, $g$, made to operate against the side of a wheel, $m$, and to be applied to the shaft, $f$, and pressed against the wheel, $m$, all substantially as specified.

In testimony whereof I have hereto set my signature this twentieth day of October, A. D. 1853.

NICHOLAS G. NORCROSS.

Witnesses:
R. H. EDDY,
F. P. HALE, Jr.